Jan. 6, 1970     H. BRETTHAUER     3,488,486
FLASH ATTACHMENT FOR PHOTOGRAPHIC CAMERAS

Filed Nov. 21, 1966     2 Sheets-Sheet 1

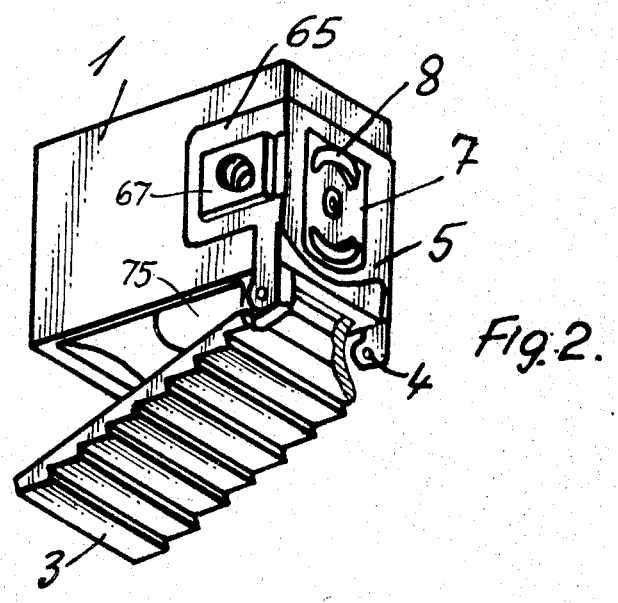
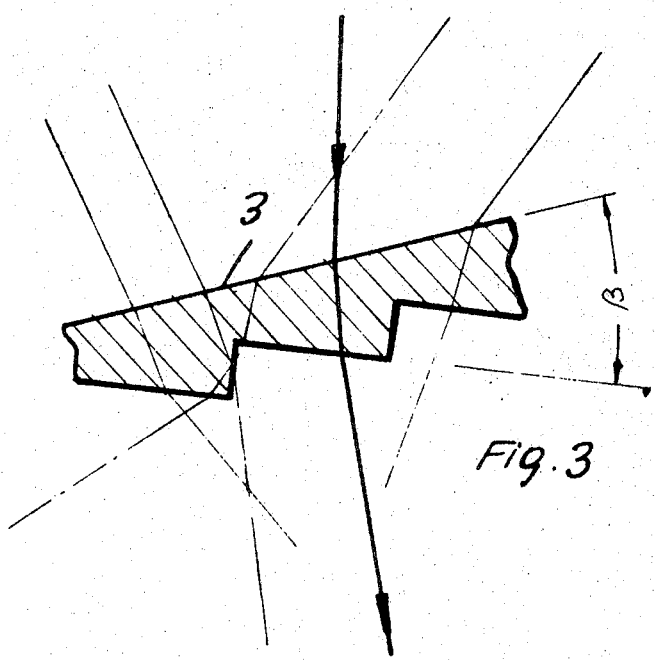

United States Patent Office 3,488,486
Patented Jan. 6, 1970

3,488,486
FLASH ATTACHMENT FOR PHOTOGRAPHIC CAMERAS
Hermann Bretthauer, Klein Stockheim uber Braunschweig, Germany, assignor to Rollei-Werke Franke & Heidecke, Braunschweig, Germany, a German firm
Filed Nov. 21, 1966, Ser. No. 595,817
Claims priority, application Germany, Nov. 23, 1965, R 31,776
Int. Cl. G03b *15/03*
U.S. Cl. 240—1.3     1 Claim

ABSTRACT OF THE DISCLOSURE

A photographic apparatus including a camera body and a wedge plate mounted to deflect light from a source of flash illumination toward the optical axis of the camera. The source of flash illumination is mounted on a flash attachment body. The plate is detachably mounted to an intermediate holder interposed between the flash attachment body and the camera body.

BACKGROUND OF THE INVENTION

Special problems arise when taking close-up photographs by flash photography. The flash illumination device (flash bulb or flash tube or other known form of illumination) is usually mounted on the camera body in fixed relation to the lens and offset from the shutter and from the optical axis which passes through the shutter. When taking pictures at moderate distances or greater distances, say for example six feet or more, the parallax effect produced by offsetting the source of illumination from the optical axis of the camera is rather slight, and the field of view is illuminated sufficiently uniformly for practical purposes.

However, when taking close-up pictures, at distances of the order of one foot to three or four feet, the parallax effect is quite noticeable. The side of the field of view which is closer to the flash source is illuminated more brilliantly than the opposite side of the field, particularly when the flash source is mounted in a fixed reflector which points straight ahead, parallel to the optical axis. Moreover, in addition to the uneven illumination, the field of view may be illuminated too brilliantly, on account of the proximity of the flash source to the field of view, so that even when the diaphragm of the camera is set to the smallest available stop or aperture, the film will still be over exposed.

SUMMARY OF THE INVENTION

It is the purpose and object of the present invention to overcome these defects, and to provide a structure which not only will deflect the light from the flash source in such a way that the close-up field will be approximately uniformly illuminated, but also will cut down the intensity of the light so as to avoid overexposure of the film.

Another object of the invention is to accomplish this by means of a simple, inexpensive, compact, and light weight structure, which can be readily moved out of the way to render it ineffective when the camera is to be used for taking photographs at greater distances rather than close-ups.

BRIEF DESCRIPTION OF THE DRAWINGS

In the drawings, which disclose a preferred embodiment of the invention,

FIG. 2 is perspective view of the flash attachment by itself, with parts broken away;

FIG. 3 is a fragmentary section through the wedge member which constitutes part of the flash attachment.

DESCRIPTION OF THE PREFERRED EMBODIMENT

Figure 1:
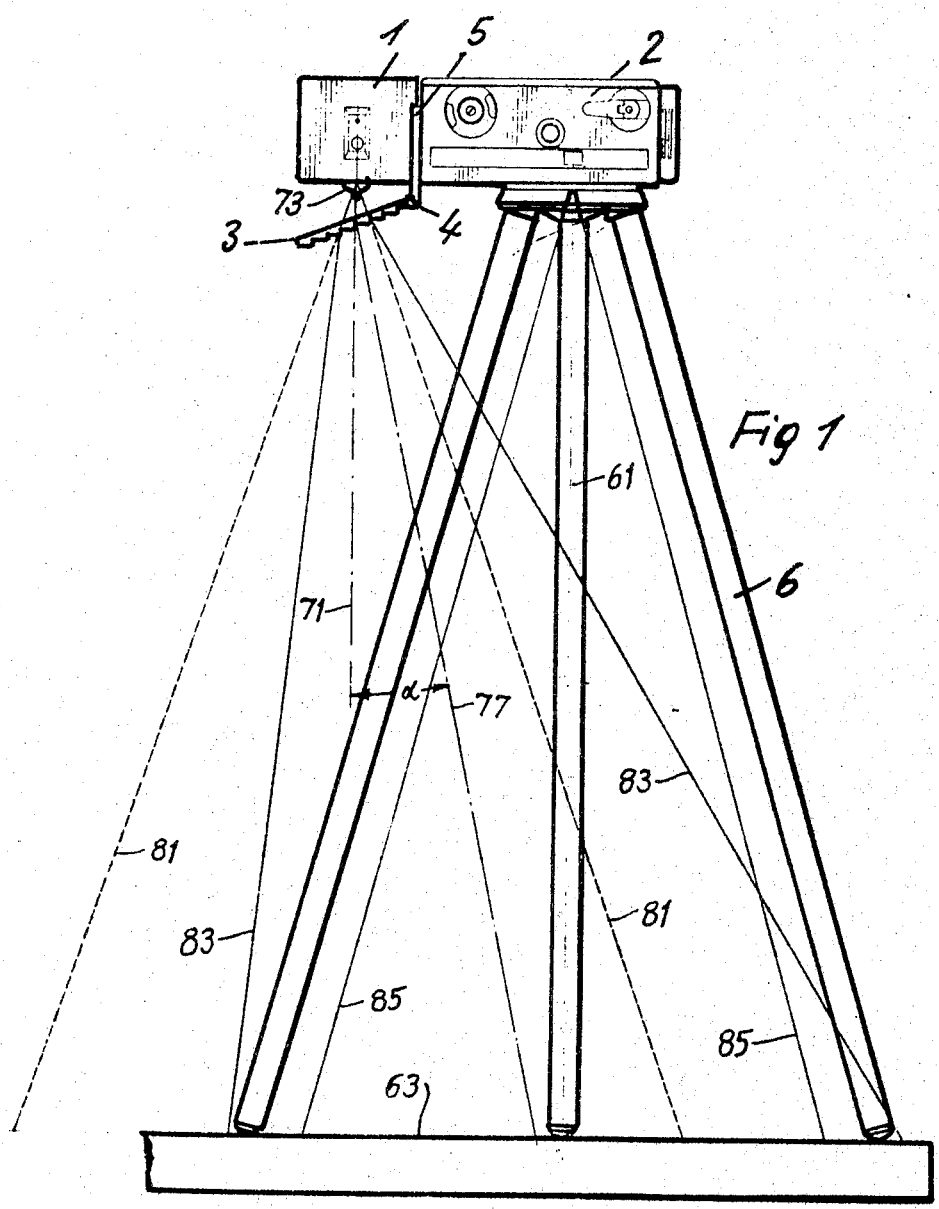
FIG. 1 is a side elevation of a camera mounted on a tripod, with a flash attachment according to the present invention mounted on the camera.

Referring now to the drawings, the flash attachment, indicated in general at 1 and further described below, is rigidly connected during use to the camera body 2 by any suitable detachable connecting means such as a screw connection or a bayonet connection, of known form. The camera 2 sits on the tripod 6 which is a tripod of the kind sometimes called a reproduction tripod, the head of the tripod being of annular form with a central opening with which the lens of the camera is alined, so that the optical axis of the camera passes straight down through the central aperture in the tripod head, along the axial line 61. When making photographic reproductions of documents or the like, the legs of the reproduction tripod may rest upon a copy board or document holder 63 on which the documents to be copied are laid. If the camera is to be used in making close-up photographs of other articles, the tripod may rest upon the ground, or the camera may be held in the hand and the tripod may be omitted entirely. Except for the flash attachment herein disclosed, the camera 2 itself may be of any suitable conventional kind known in the art.

The wedge plate 3, so formed as to deflect the light rays from the source of flash illumination in the manner further described below, is hinged by a hinge 4 either directly to the flash attachment 1, or preferably to the intermediate hinge support or holder 5 which is interposed between the flash attachment body 1 and the camera body 2 and is firmly held between them when the flash attachment body is operatively connected to the camera body. The intermediate member 5, when used, is preferably of springy sheet metal, formed with lateral ears 65 which resiliently engage two opposite side walls of the flash attachment body 1 to embrace the body between them. Preferably these ears have openings engaging over retaining projections 67 which project outwardly from the appropriate sides of the body 1, thus anchoring the holder 5 firmly but detachably on the flash attachment body 1, to remain therewith as a unit when the flash attachment body 1 is removed from the camera body 2. That portion of the holder 5 which extends between the flash attachment body 1 and the camera body 2 is formed with an opening 7 through which the bayonet components 8 of the flash attachment are accessible so as to mate with and interlock with the cooperating bayonet connection attachments on the adjacent end wall of the camera body 2, such bayonet connection parts being conventional. The hinges 4 preferably have sufficient friction to retain the plate 3 in any angular position or inclination in which it may be manually placed. Conventional detent means can be provided for holding the plate in a predetermined angular position, or in any selected one of a plurality of predetermined angular positions. The hinge axis preferably extends perpendicular to a common plane containing the camera optical axis 61 and the flash optical axis 71.

The deflecting member or plate 3 is formed preferably of suitable transparent or translucent plastic material, shaped to form an optical wedge, although preferably an interrupted wedge or raster as shown especially in FIGS. 2 and 3, in order to lighten the plate and make it less thick at what would otherwise be the thick end of the wedge.

The wedge angles beta (FIG. 3) are so chosen that the central beam 71 (FIG. 1) coming from the flash source 73 schematically shown in FIG. 1, and from the reflector schematically shown at 75 in FIG. 2, normally extending parallel to the camera's axis 61, will be deflected through the angle alpha (FIG. 1) to follow the path 77, intersecting the optical axis 61 of the camera at or fairly close to the field of view, for example at the copy board or document support 63. In other words, the effect of the stepped wedge 3 is to shift the cone of rays coming from the flash source so that instead of the cone of rays falling within the limiting lines schematically shown at 81, it will be deflected to the position indicated by the lines 83. It will be noted that this deflected position of the cone of rays covers the field of view of the light cone of the camera, as defined by the lines 85, whereas the original undeflected cone 81 (symmetrical around the undeflected flash axis 71) covers only part of the field of view of the camera, and a good deal of the light is wasted, to one side of the field of view.

The proper angle beta of the wedge steps is determined according to well known optical principles, so as to achieve the desired deflection angle alpha, taking into account the offset distance between the camera axis 61 and the flash axis 71, the distance from the camera to the field of view which is to be photographed, and the index of refraction of the material from which the plate 3 is made, since these factors just mentioned will determine the theoretical magnitude of the angle alpha.

The flash source 73 may be either a flash bulb of any conventional kind, or a flash tube for producing what is sometimes called electronic flash, such details being unimportant for purposes of the present invention. Depending upon the particular bulb or tube employed, it may at times project below the bottom face of the flash attachment casing or body 1, as shown at 73 in FIG. 1, or it may be recessed into the casing 1. In either event, there is usually a conventional concave reflector 75 within the casing 1, behind the flash bulb or tube, and this reflector usually has a fixed position, so placed or oriented that the axis of the cone of rays or beam of light from the reflector will follow the path 71 parallel or substantially parallel to the optical axis 61 of the camera with which the flash attachment is used.

The reflector usually has sufficient dispersion effect so that the slope or inclination of the wedge plate is not critical. It can be shown in practice that, with a conventional reflector having normal dispersion, the exact angle at which the deflecting plate 3 is placed, is not particularly critical and does not have much influence, if any, on the angle of deflection alpha, which is determined mainly if not entirely by the wedge angle beta. The plate can be placed so that its flat surface is normal or perpendicular to the flash axis 71, or can be swung from this position through a range of about 30 degrees (i.e., to about 60 degrees from the axis 71), and can be varied as desired.

This has the advantage that it is possible to use the same wedge plate with different types or sizes of flash sources. For example, when the flash source (bulb or tube) projects from the casing 1, as shown in FIG. 1, the plate 3 may be swung to an oblique position so as to extend across the cone of rays from the flash source, but not to make contact with or be too close to the flash source 73. On the other hand, if the flash bulb or tube is recessed within the housing or casing 1, the wedge plate 3 may be swung further upwardly, to be approximately parallel to or perhaps in contact with the bottom face of the housing 1. When the flash equipment is not in use, the plate may be swung against the housing 1 and may serve as a cover for the reflector within the housing, helping to prevent dust from entering. When the flash equipment is to be used, but at greater focus distances so that the wedge plate 3 is not necessary, it may be swung to a position out of the way of the light rays, without having to remove it entirely.

When copying documents or taking other close-ups at very short focus distances, the light may be too brilliant and may cause overexposure of the film, even when the diaphragm of the camera is stopped down to the smallest aperture. This difficulty is accentuated when the camera is equipped with certain types of "programmed" shutter wherein a predetermined shutter speed is always associated with a particular diaphragm aperture. Such overexposure may be overcome by providing the plate 3 with a tint or tone to cut down the light transmission therethrough, or by providing a separate tinted or toned filter layer or plate, which may be laid on the smooth or flat side of the deflecting wedge plate 3. For example, the entire wedge plate 3 may be of translucent plastic material with a neutral gray coloring, or it may be of colorless transparent material (plastic or glass) with a neutral gray filter sheet or foil of plastic material on the flat side thereof. Although glass is possible, it is preferred to make the wedge plate of plastic material rather than glass, to avoid danger of having the wedge plate crack when subjected to the intense heat of a flash bulb in close proximity to the plate.

Although the wedge plate has been shown in connection with a separate flash attachment mounted on the camera body, it will be understood that this is merely by way of convenient example. Many modern cameras have holders or mountings for flash bulbs or flash tubes permanently fixed to the camera body itself, requiring no separate flash attachment. The present invention is equally useful with such cameras. The deflecting plate is simply hinged to an appropriate part of the camera body, or to a spring clip or holder mounted on the body, in such position that it can extend transversely across the path of light rays produced by the flash source, without interfering with the photographic field of view, and preferably is hinged so that it can be swung completely aside when photographs are to be taken in a normal focus range, where the deflector is not necessary.

What is claimed is:

1. A flash attachment for a photographic camera having an optical axis and provided with a source of flash illumination having a flash axis offset from and parallel to said camera optical axis, said flash attachment comprising an optical wedge plate in the form of a stepped wedge located in front of said source of flash illumination and swingably mounted with respect to said source about a hinge axis approximately perpendicular to a plane containing said flash axis and said camera optical axis, said wedge plate having wedge steps extending approximately parallel to said hinge axis and effective to deflect light from said source of illumination toward said camera optical axis so that the central beam of a cone of light from said source will intersect said optical axis of the camera relatively close to the camera approximately at the focal distance at which a relatively close-up photograph is to be taken, said source of flash illumination being mounted on a flash attachment body separate from and detachably secured to said camera, a holder having a portion interposed between and held between said flash attachment body and said camera, said holder having two spaced walls lying on opposite side walls of said body and embracing said body between them and a third wall connecting said two spaced walls to each other, said third wall being in a position interposed between said flash attachment body and said camera when said body is in normal secured position on said camera, said wedge plate being detachably mounted on said holder.

References Cited

UNITED STATES PATENTS

| | | | |
|---|---|---|---|
| 3,227,509 | 1/1966 | Baker | 95—11 |
| 2,748,263 | 5/1956 | Franck et al. | 240—106.1 X |
| 2,985,062 | 5/1961 | Clapp | 88—24 |
| 3,089,024 | 5/1963 | Odle | 240—106 |
| 3,172,345 | 3/1965 | Jakob et al. | 95—11 |

NORTON ANSHER, Primary Examiner
FRED L. BRAUN, Assistant Examiner

U.S. Cl. X.R.

95—11; 240—106.1